United States Patent [19]

Brasca et al.

[11] Patent Number: 5,582,396
[45] Date of Patent: Dec. 10, 1996

[54] PART HOLDER, PARTICULARLY FOR WORKSTATIONS WITH A REVOLVING TABLE

[76] Inventors: Carlo Brasca; Daniele Brasca, both of Via Puccini 13, 28085 Locate di Triulzi, Italy

[21] Appl. No.: 352,736

[22] Filed: Dec. 2, 1994

[30] Foreign Application Priority Data

Dec. 6, 1993 [IT] Italy .................................. MI93A2584

[51] Int. Cl.⁶ ..................................................... B23Q 3/00
[52] U.S. Cl. ............................ 269/20; 269/57; 269/309; 269/900
[58] Field of Search .................................. 269/20, 56, 57, 269/63, 64, 309, 900; 29/33 J, 35.5, 36, 38 B

[56] References Cited

U.S. PATENT DOCUMENTS

| | | | |
|---|---|---|---|
| 4,445,675 | 5/1984 | Kitaura | 269/20 |
| 4,468,019 | 8/1984 | Staudenmaier | 269/56 |
| 4,585,217 | 4/1986 | Erickson | 269/56 |
| 4,610,440 | 9/1986 | Casset | 269/20 |
| 4,611,484 | 9/1986 | MacKissinger, Jr. et al. | 269/309 |
| 4,678,077 | 7/1987 | Bertorello | 269/20 |
| 4,688,974 | 8/1987 | Wright et al. | 269/309 |

FOREIGN PATENT DOCUMENTS

| | | |
|---|---|---|
| 0209100 | 1/1987 | European Pat. Off. . |
| 2158240 | 6/1973 | France . |
| 2691659 | 12/1993 | France . |
| 4219967 | 12/1993 | Germany . |
| 1096082 | 6/1984 | U.S.S.R. . |
| 9112925 | 9/1991 | WIPO . |

*Primary Examiner*—Robert C. Watson
*Assistant Examiner*—Thomas W. Lynch
*Attorney, Agent, or Firm*—Guido Modiano; Albert Josif

[57] ABSTRACT

The part holder for workstations with a revolving table has a first prism-shaped supporting element and at least one second supporting element which is adapted to support parts to be machined. The holder comprises locator pins for positioning the second supporting element on a lateral face of the first supporting element and protrusions for removably locking the second supporting element on the face.

16 Claims, 3 Drawing Sheets

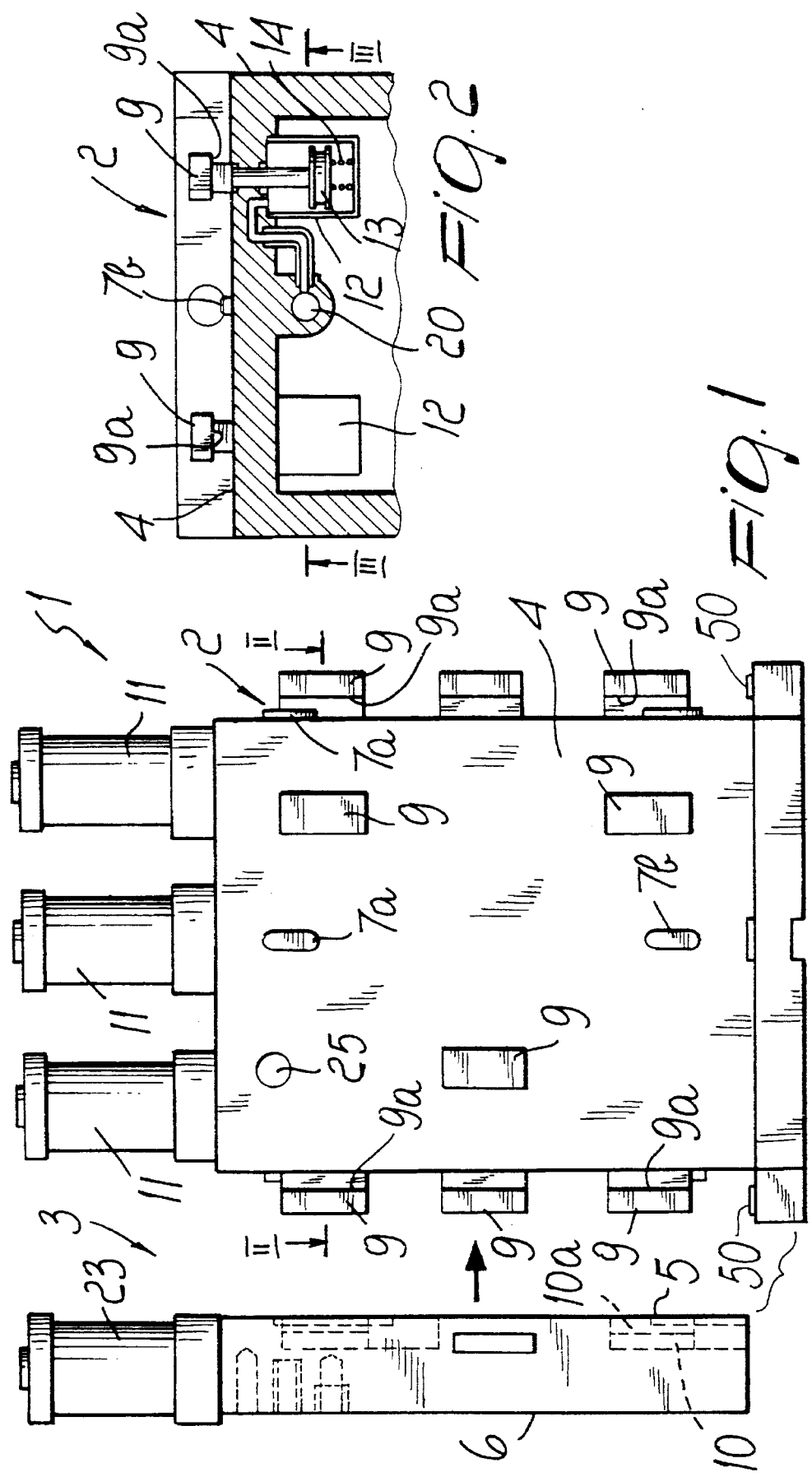

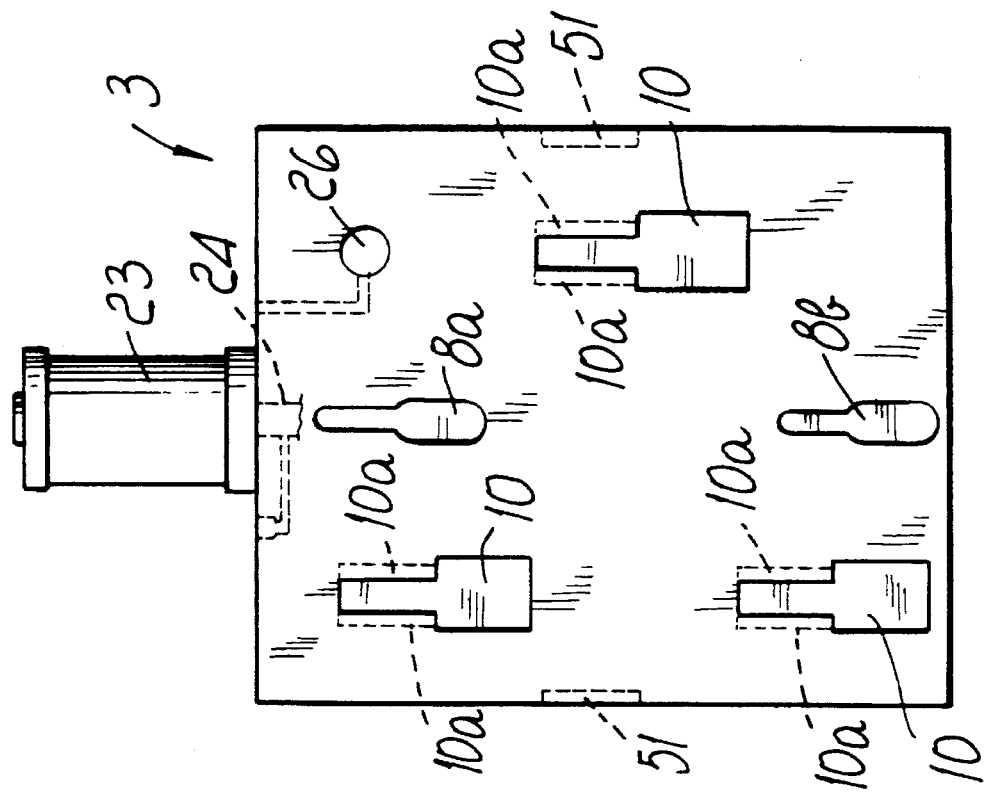
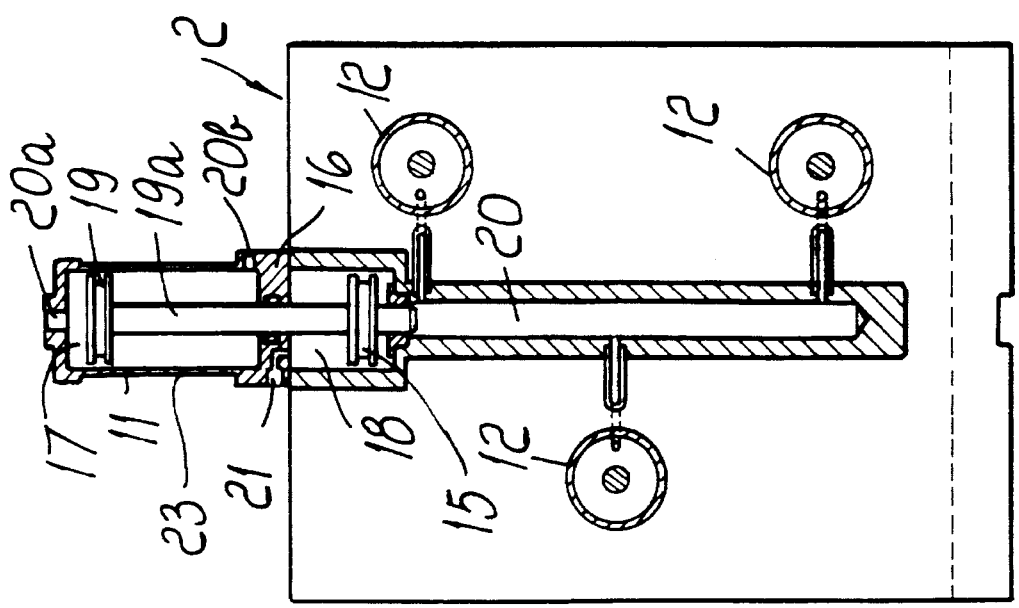

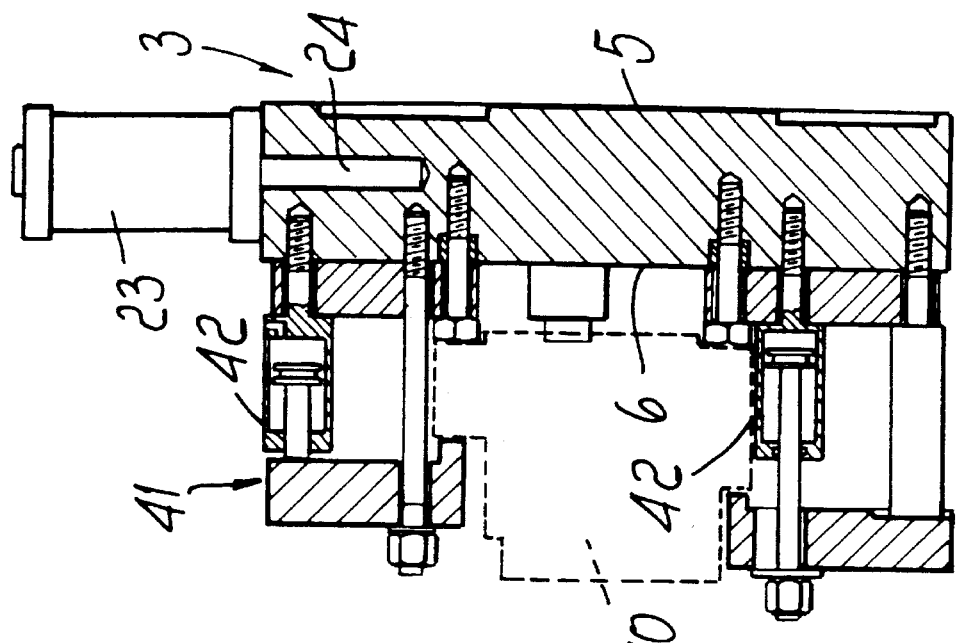
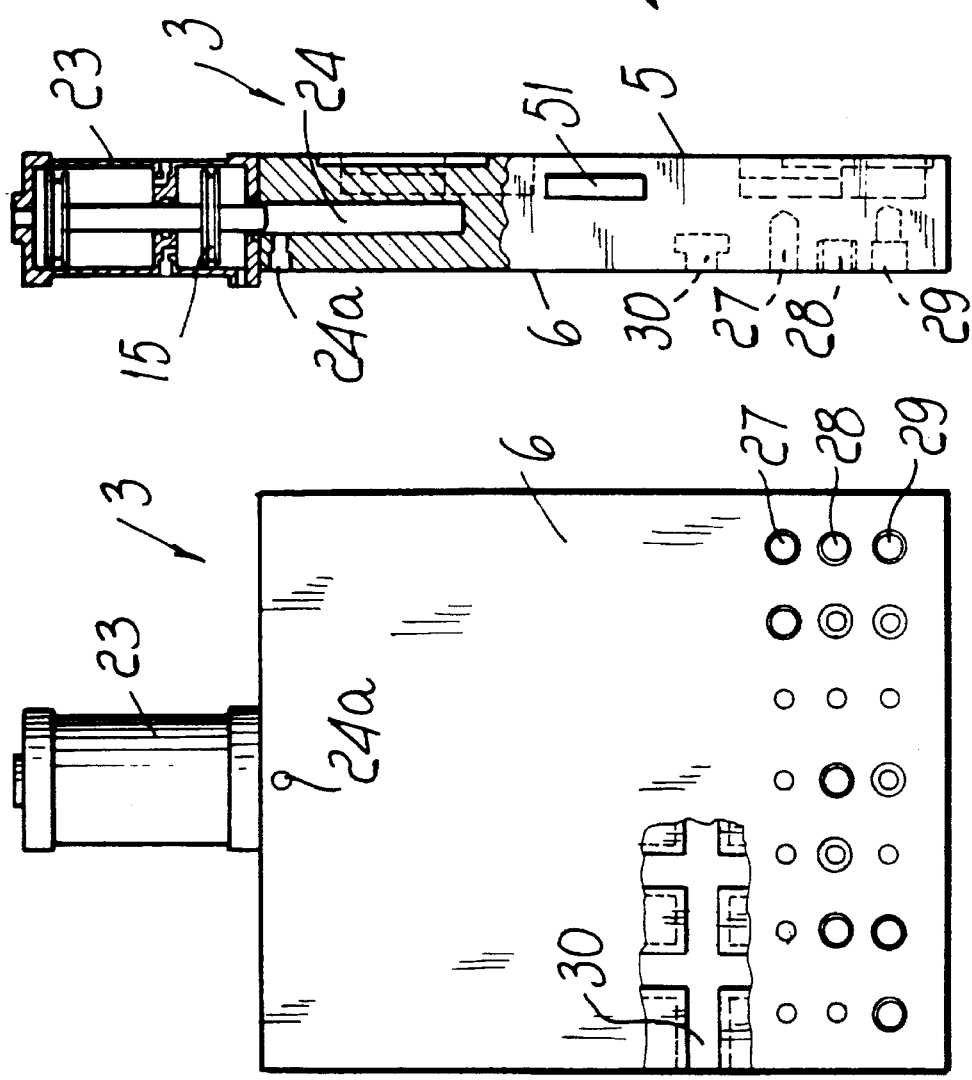

PART HOLDER, PARTICULARLY FOR WORKSTATIONS WITH A REVOLVING TABLE

BACKGROUND OF THE INVENTION

The present invention relates to a part holder particularly for workstations or machining centers with a revolving table.

It is known that the evolution of machine tools for the machining of metal and nonmetallic parts by chip-forming has led to the production of increasingly complicated and sophisticated workstations in which it is possible to subject the parts to various machining operations. More particularly, these workstations are usually provided with a holder that is substantially shaped like a parallelepiped with a square base, and the parts to be machined are rigidly coupled, by virtue of suitable locking devices, to the lateral faces of said holder, so that the tools of the workstation, which are appropriately moved along at least two mutually perpendicular axes, can reach the parts with high precision and machine them.

Some workstations include a table which generally revolves about a vertical axis and on which the holder is placed so that the tools can move towards the parts mounted on the holder not only by virtue of the movement of said tools but also by virtue of the rotation of the holder about said vertical axis.

Workstations obviously require considerable investments which can be amortized, and thus lead to an economically advantageous activity, only if machining downtimes, such as for example the time required to mount the parts on the holder or remove them from it, are minimized.

The current trend is to provide holders that can carry a large number of parts and to have at least two holders, also known as pallets, which are alternately placed on the revolving table of the workstation. In this manner, while the workstation is machining one batch of parts, it is possible to mount the next batch of parts on the other holder, which replaces the first one once its parts have been machined. In this way it is possible to minimize machining downtimes but there is the drawback of having to purchase two or more holders which are relatively expensive because they are very high precision products.

In some cases it is also necessary to manufacture a special holder for particular parts to be machined. In such cases, the holder, after a small number of runs, is generally stored until the next request for special parts. In this case, in addition to the high purchase cost of such holders, there is also the problem of additional costs, that is to say losses, linked to nonuse of the holder.

Another drawback that can be observed in the use of currently commercially available holders, in which the parts to be machined must be mounted on the lateral faces of said holder, is constituted by the fact that the operator encounters some difficulty in locking the parts as they tend to move, due to their weight, during this operation.

SUMMARY OF THE INVENTION

The aim of the present invention is to solve the above described problems by providing a part holder, particularly for workstations with a revolving table, that allows to reduce machining downtimes, as in the case of multiple interchangeable part holders, and also allows significant savings as regards its purchase cost with respect to said conventional holders.

Within the scope of this aim, an object of the invention is to provide a part holder which simplifies the operations for positioning and locking the parts.

Another object of the invention is to provide a holder that allows high precision in part positioning.

This aim, these objects, and others which will become apparent hereinafter are achieved by a part holder, particularly for workstations with a revolving table, characterized in that it comprises: a first prism-shaped supporting element; at least one second supporting element, which is meant to carry the parts to be machined; means for positioning said second supporting element on a lateral face of said first supporting element; and means for removably locking said second supporting element on said face.

BRIEF DESCRIPTION OF THE DRAWINGS

Further characteristics and advantages of the invention will become apparent from the description of a preferred but not exclusive embodiment of the device according to the invention, illustrated only by way of non-limitative example in the accompanying drawings, wherein:

FIG. 1 is a partially exploded front elevation view of the device according to the invention;

FIG. 2 is a partial sectional view of FIG. 1, taken along the plane II—II;

FIG. 3 is a schematic sectional view of FIG. 2, taken along the plane III—III;

FIG. 4 is a view of the second supporting element, taken from its side meant to face said first supporting element;

FIG. 5 is a view of the second supporting element, taken from its side located furthest from the first supporting element;

FIG. 6 is a partially sectional lateral elevation view of the second supporting element;

FIG. 7 is a partially sectional lateral elevation view of the second supporting element, to which devices for locking a part to be machined have been applied.

DESCRIPTION OF THE PREFERRED EMBODIMENTS

With reference to the above figures, the holder according to the invention, generally designated by the reference numeral 1, comprises: a first supporting element 2, which is prism-like and preferably shaped like a parallelepiped with a square or rectangular base; and at least one second supporting element 3, which is meant to support the parts to be machined. The first supporting element 2 has means for positioning the second supporting element 3 on a lateral face 4 of said first supporting element and means for removably locking said second supporting element on said face; said means are preferably of the automatically actuated type.

More particularly, the second supporting element 3 is also substantially shaped like a parallelepiped with an end face 5 that substantially matches one of the lateral faces 4 of the first supporting element 2 and is adapted to face said lateral face 4; the opposite end face 6 of the second supporting element 3 is adapted to support the parts 40 to be machined, as will become apparent hereinafter.

In order to fully exploit the productive potential of a workstation equipped with the holder according to the invention, the holder comprises a plurality of second supporting elements 3; preferably, there are more second supporting elements than faces of the first supporting element 2.

The positioning means conveniently comprise two protruding elements or tabs, or locator pins, 7a and 7b which protrude at right angles from each lateral face 4 of the first supporting element 2 and are preferably aligned along a vertical median line of the corresponding lateral face 4. Said tabs 7a and 7b can be accommodated in recessed elements or seats 8a and 8b correspondingly formed on the end face 5 of the second supporting element 3. Conveniently, the seats 8a and 8b have a wider lower portion directed towards a first end of the part holder, so as to allow to easily insert the tabs 7a and 7b in said wider portion and so as to precisely engage the tabs 7a and 7b with the remaining narrower portion, directed towards the second end of the part holder 1, of the seats 8a and 8b by means of a vertical downward movement of the second supporting element 3 with respect to the first supporting element 2. As seen in FIG. 4, the wider portions of the seats are wider with respect to the narrower portions of the seats in a transverse direction extending transversely with respect to the vertical extension of the part holder 1 extending vertically between the first and second ends of the part holder 1.

The positioning means also comprise a locator 50 which is located on the base of the first supporting element 2 for the resting of the lower side of the second supporting element 3.

The means for locking the second supporting element 3 on the corresponding lateral face 4 of the first supporting element 2 comprise protruding elements or protrusions 9 which protrude from the lateral faces 4 of the first supporting element 2 and form shoulders 9a which are directed towards the corresponding lateral face 4. Said protrusions 9 can engage, by means of their shoulders 9a, abutments 10a of recessed elements or recesses 10 which are correspondingly formed in the end face 5 of the second supporting element 3. More particularly, the protrusions 9 are substantially T-shaped in a sectional view taken along a horizontal plane, and their base is directed towards the corresponding lateral face 4 of the first supporting element 2; the recesses 10 have a lower parallelepipedal portion and an upper portion which is also substantially T-shaped in cross-section so as to match the shape of the protrusions 9, so that the protrusions 9 can be easily inserted within the lower wider portion of the recesses 10, directed towards the first end of the part holder, and be engaged with the abutments 10a of the upper narrower portion, directed towards the second end of the part holder, of the recesses 10 by moving the second supporting element 3 vertically downward with respect to the first supporting element 2. Also as seen in FIG. 4, the wider portions of the recesses are wider with respect to the narrower portions of the recesses in a transverse direction extending transversely with respect to the vertical extension of the part holder 1 extending vertically between the first and second ends of the part holder 1.

Conveniently, there are means for actuating the protrusions 9 in a direction that lies substantially at a right angle to the corresponding lateral face of the first supporting element 2, so as to lock or release, by means of this movement, the second supporting element 3 on a lateral face of the first supporting element 2.

Said actuation means are conveniently constituted by at least one pneumatic-hydraulic cylinder 11 which, as shown in detail in FIGS. 2 and 3, feeds hydraulic cylinders 12 which are located inside the first supporting element 2 and are connected, by means of the stem of their piston 13, to the protrusions 9 so that when the pneumatic-hydraulic cylinder 11 feeds pressurized liquid, the protrusions 9 move towards the corresponding lateral face 4 of the first supporting element, locking the second supporting element 3. The protrusions 9 are moved in the opposite direction by means of a return spring 14 which is accommodated in the corresponding hydraulic cylinder 12.

The use of the pneumatic-hydraulic cylinder 11 also allows to divide the stroke with which the protrusion 9 moves towards the corresponding side wall 4 into two parts: a first part at low power, so as to allow to perfect the positioning of the second supporting element 3 with respect to the first supporting element 2; and a second part, with a considerably larger force, which finally locks the second supporting element 3 on the first supporting element 2.

The pneumatic-hydraulic cylinder 11 in fact has a substantially cylindrical body which is divided by an intermediate partition 16 into two half-chambers 17 and 18. The first half-chamber 17 accommodates a piston 19 provided with a stem 19a that extends into the second half-chamber 18 and can enter a duct 20 that runs coaxially from the axial end of the half-chamber 18 that lies furthest away from the partition 16. The first half-chamber 17 can be supplied with compressed air by means of ports 20a and 20b which are arranged at, or adjacent to, its axial ends, respectively, whereas the second half-chamber 18 can be supplied with compressed air only through a port 21 which is formed proximate to the partition 16, as the piston 15, which is axially crossed by the stem 19a, also acts as an element for separating the air introduced through the port 21 from the liquid that fills the remaining part of the half-chamber 18 and the duct 20 connected to the cylinders 12.

In practice, by introducing compressed air through the port 21, the piston 15 is moved and pressurized liquid is thus fed into the hydraulic cylinders 12 that move, with a limited force, the protrusions 9 towards the corresponding lateral face 4 of the first supporting element 2. Then the introduction of compressed air through the port 20a, while the other port 20b is connected to the discharge, moves the piston 19 and inserts the stem 19a inside the duct 20, consequently conveying liquid at high pressure into the cylinders 12; this moves the protrusions 9 with considerable force towards the corresponding lateral face 4 and consequently locks the second supporting element 3.

A pneumatic-hydraulic cylinder 23, similar to the pneumatic-hydraulic cylinder 11, or another known type of fluid-driven actuator, can also be arranged on the second supporting element 3 so that its pressurized-liquid conveyance duct 24 has an outlet 24a on the end face 6. Said outlet 24a is meant to be connected to fluid-driven actuators to actuate optional devices for locking the parts 40 to be machined, which are located on the end face 6 of the second supporting element 3.

Passages 25 for pressurized fluid lines may also be provided on each one of the lateral faces 4 of the first supporting element 2 and can also be used to actuate optional devices for locking the parts 40, to actuate the cylinders 23, or for other purposes. The passages 25 face corresponding passages 26 formed in the second supporting element 3 to allow the lines to reach the end face 6 of the second supporting element.

As shown in particular in FIG. 5, threaded holes, guiding bushes, threaded holes with bushes 27, 28, and 29 which are conveniently spaced, slots with a T-shaped cross-section, or other known systems for anchoring devices for locking the parts 40 to be machined can be provided on the end face 6 of the second supporting element 3.

The part 40 to be machined is rigidly coupled to the end face of the second supporting element 3 by means of known kinds of devices 41 which are anchored to the second supporting element 3 by using the holes 27, 28, and 29 and the grooves 30. Said locking devices can include hydraulic actuators 42 which can be appropriately actuated by the pneumatic-hydraulic cylinder 23.

The use of the part holder according to the invention is as follows.

The parts 40 to be machined are mounted on the end face 6 of the second supporting element 3 while it is disengaged from the first supporting element 2 and is arranged so that its end face 6 is directed upwards on a supporting table provided with fixtures. The operation for positioning and locking the parts 40 on the second supporting element 3 is very easy in this position, as the operator does not have to bear the weight of the part; accordingly, the positioning operation can be performed very easily with high precision even while the machine is working.

After locking the part or parts 40 on the second supporting element 3, the supporting element 3 is arranged so that its end face 5 faces the lateral face 4 of the first supporting element 2, optionally with the aid of conventional lifting devices that can engage within lateral slots 51 provided for this purpose in the sides of the second supporting element. By means of a downward movement of the second supporting element 3 with respect to the first supporting element 2, the tabs 7a and 7b are coupled to the corresponding seats 8a and 8b, while the protrusions 9 enter the recesses 10 by virtue of the same movement. The descent of the second supporting element 3 is stopped precisely by the locators 50. At this point the pneumatic-hydraulic cylinder 11 is actuated and performs a first gentle locking of the second supporting element 3. In this manner it is possible to correct any errors in the position of the second supporting element 3 before the pneumatic-hydraulic cylinder finally locks the second supporting element 3 by means of the further actuation of the protrusions 9, as described above.

At this point, the parts 40 can be machined by the tools of the workstation and, at the end of the machining operations, the supporting element 3 can be replaced with another supporting element 3 which has meanwhile been loaded with other parts to be machined.

It should be noted that the second supporting element 3 can be provided with the holes 27, 28, and 29 or the grooves 30 already provided in it, although its end face 6 may also be plain, leaving it to the end user to form the seats for the engagement of the devices 41 for locking the parts 40 according to the shape of the part.

In this manner the second supporting element 3, which is the part of the holder according to the invention that must be replaced to eliminate production downtimes, can have very low purchase costs that make even its occasional use convenient.

In practice it has been observed that the part holder, particularly for workstations with a revolving table, fully achieves the intended aim, because it allows to reduce machining downtimes, as in the case of workstations that use at least two interchangeable supporting elements, although its purchase and running costs are considerably lower than conventional devices, as it does not require complete replacement for loading and unloading the parts but merely requires the replacement of the second supporting element, which is a component that has a considerably lower cost than conventional supporting elements.

Another advantage is that the holder according to the present invention, allows much easier part loading and unloading than conventional holders.

Although the holder according to the invention has been conceived particularly for workstations in which the table revolves about a vertical axis, it can in any case be used for workstations in which the table revolves about a horizontal axis or for other types of, as well as for transfer machines or for other machine tools.

The part holder thus conceived is susceptible of numerous modifications and variations, all of which are within the scope of the inventive concept; all the details may furthermore be replaced with other technically equivalent elements.

In practice, the materials employed, as well as the dimensions, may be any according to the requirements and the state of the art.

What is claimed is:

1. A part holder, particularly for workstations with a revolving table, comprising:

a first prism-shaped supporting element;

at least one second supporting element, adapted to carry the parts to be machined;

means for positioning said second supporting element on a lateral face of said first supporting element; and means for removably locking said second supporting element on said face; wherein said means for positioning said second supporting element on a lateral face of said first supporting element comprise a protruding element and a recessed element arranged between said second supporting element and the lateral face of said first supporting element, said protruding element being removably engaged in said recessed element when said second supporting element is positioned on a lateral face of said first supporting element, said recessed element having a wider portion arranged towards a first end of the part holder and a narrower portion arranged towards a second end of the part holder, and said wider portion being wider than said narrower portion in a transverse direction extending transversely with respect to an extension of the part holder extending between the first and second ends of the part holder, such that the protruding element is first engageable in the wider portion of the recessed element when the second supporting element is being initially positioned on the lateral face of the first supporting element and such that the protruding element is subsequently engageable in the narrower portion of the recessed element after a vertical downward movement of the second supporting element with respect to the first supporting element.

2. The holder according to claim 1, wherein said removable locking means are of the automatically actuated type.

3. The holder according to claim 2, wherein said first supporting element is substantially shaped like a parallelepiped with a square base and in that each one of the lateral faces of said first supporting element is provided with said positioning means and with said locking means which can removably engage said second supporting element.

4. The holder according to claim 1, wherein said second supporting element is substantially shaped like a parallelepiped in which one end face is meant to support the parts to be machined and the other end face is provided with means for engaging said positioning means and said locking means.

5. The holder according to claim 1, wherein said positioning means comprise two protruding elements in the form of two tabs which protrude from each lateral face of said first supporting element and are aligned along a vertical direction, said positioning means further comprising two recessed elements in the form of two seats which are formed in the end face of said second supporting element that is meant to be directed towards said first supporting element, said seats being engageable by said tabs.

6. The holder according to claim 1, wherein said locking means comprise protrusions that protrude from the lateral faces of said first supporting element, can be inserted in recesses formed in an end face of said second supporting element, and have shoulders which are directed towards said first supporting element and can engage abutments formed in said recesses, means being provided for actuating said protrusions to move them along a direction that lies substantially at a right angle to the corresponding lateral face of said first supporting element in order to lock or release said second supporting element.

7. The holder according to claim 6, wherein said actuation means comprise at least one pneumatic-hydraulic cylinder which is mounted on said first supporting element.

8. The holder according to claim 1, wherein said second supporting element is provided with devices for locking the part to be machined which is placed on said second supporting element.

9. The holder according to claim 8, wherein said holder comprises a fluid-driven actuator which is mounted on said second supporting element and can be connected to said part locking devices located on said second supporting element in order to actuate them.

10. A part holder, particularly for workstations with a revolving table, comprising:

a first prism-shaped supporting element;

at least one second supporting element, adapted to carry the parts to be machined, and adapted for being removably positioned and supported on a lateral face of said first supporting element; and a protruding element and recessed element set arranged between said second supporting element and the lateral face of said first supporting element, said protruding element and recessed element set including a protruding element and a recessed element, said protruding element being removably engaged in said recessed element when said second supporting element is positioned and supported on a lateral face of said first supporting element, said recessed element having a wider portion arranged towards a first end of the part holder and an narrower portion arranged towards a second end of the part holder, and said wider portion being wider than said narrower portion in a transverse direction extending transversely with respect to an extension of the part holder extending between the first and second ends of the part holder, such that the protruding element is first engageable in the wider portion of the recessed element when the second supporting element is being initially positioned on the lateral face of the first supporting element and such that the protruding element is subsequently engageable in the narrower portion of the recessed element after a vertical downward movement of the second supporting element with respect to the first supporting element.

11. The part holder of claim 10 comprising at least two protruding element and recessed element sets.

12. The part holder of claim 10 wherein said protruding element has a substantially T-shaped horizontal cross-section and said narrower portion of said recessed element also has a substantially T-shaped horizontal cross-section so as to match the shape of said protruding element.

13. The part holder of claim 12 wherein said protruding element has a movable head for releasably engaging an abutment of said narrower portion of said recessed element in order to releasably lock said second supporting element to said first supporting element.

14. The part holder of claim 13 further comprising means for movably actuating said movable head of said protruding element.

15. The part holder of claim 13 further comprising a spring-biased hydraulic cylinder for movably actuating said movable head of said protruding element.

16. The part holder of claim 15 further comprising a pneumatic-hydraulic cylinder for feeding pressurized liquid to said spring-biased hydraulic cylinder, said pneumatic-hydraulic cylinder comprising two-half chambers divided by an intermediate partition and a stem including two pistons each of which are accommodated respectively in one of said two-half chambers.

* * * * *